United States Patent
Dalley, Jr. et al.

(10) Patent No.: US 9,483,926 B2
(45) Date of Patent: *Nov. 1, 2016

(54) MONITORING INMATE MOVEMENT WITH RFID

(71) Applicant: Codex Corporation, Maple Grove, MN (US)

(72) Inventors: Kenneth L. Dalley, Jr., Otsego, MN (US); Brett Wilmeth, Hanover, MN (US)

(73) Assignee: Codex Corporation, Maple Grove, MN (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/677,082

(22) Filed: Apr. 2, 2015

(65) Prior Publication Data

US 2015/0213701 A1  Jul. 30, 2015

Related U.S. Application Data

(63) Continuation of application No. 13/837,739, filed on Mar. 15, 2013, now Pat. No. 9,024,754.

(51) Int. Cl.
   *G08B 1/08*     (2006.01)
   *G08B 21/02*    (2006.01)
   *G08B 21/18*    (2006.01)
   (Continued)

(52) U.S. Cl.
   CPC ....... *G08B 21/0275* (2013.01); *G06K 7/10366* (2013.01); *G06Q 10/06* (2013.01); *G08B 21/18* (2013.01)

(58) Field of Classification Search
   CPC ............ G08B 21/088; G08B 21/0202; A61B 5/1112; G06K 2207/1012; G06Q 10/063114

USPC ....... 340/539.13, 573.4, 539.1, 539.15, 10.1; 235/385; 705/23

See application file for complete search history.

(56) References Cited

U.S. PATENT DOCUMENTS

| 4,814,751 A |   | 3/1989 | Hawkins et al. |
|---|---|---|---|
| 5,218,344 A | * | 6/1993 | Ricketts .............. G07C 9/00111 340/10.6 |
| 7,636,047 B1 |   | 12/2009 | Sempek |

(Continued)

OTHER PUBLICATIONS

"U.S. Appl. No. 13/837,739, Non Final Office Action mailed Jul. 17, 2014", 7 pgs.

(Continued)

*Primary Examiner* — Phung Nguyen
(74) *Attorney, Agent, or Firm* — Schwegman Lundberg & Woessner, P.A.

(57) ABSTRACT

The disclosure relates to systems and methods for tracking offender movement with RFID. Such a system can include a transponder associated with an offender and a radar module configured to determine a direction of a moving object passing within range of the radar module. The system can include a radio frequency identification reader situated near the radar module and configured to transmit an interrogating signal to the transponder and receive an identifying signal in response to the transponder receiving the interrogating signal. The system can include a server configured to receive data from the radio frequency identification reader and the radar module through a network, transmit the received data to a web service through the network, and receive an alert from the web service that a monitoring rule of a plurality of monitoring rules associated with the offender was violated.

13 Claims, 6 Drawing Sheets

(51) Int. Cl.
*G06Q 10/06* (2012.01)
*G06K 7/10* (2006.01)

(56) References Cited

U.S. PATENT DOCUMENTS

| | | |
|---|---|---|
| 8,626,195 B2 | 1/2014 | Noonan et al. |
| 9,024,754 B2 | 5/2015 | Dalley, Jr. et al. |
| 2006/0184544 A1 | 8/2006 | Harper |
| 2008/0316023 A1 | 12/2008 | Crowl et al. |
| 2011/0059688 A1 | 3/2011 | Noonan et al. |
| 2012/0154155 A1 | 6/2012 | Brasch |
| 2012/0313759 A1* | 12/2012 | Markwitz ............ G06Q 10/087 340/10.1 |
| 2014/0266704 A1 | 9/2014 | Dalley, Jr. et al. |

OTHER PUBLICATIONS

"U.S. Appl. No. 13/837,739, Notice of Allowance mailed Jan. 5, 2015", 6 pgs.
"U.S. Appl. No. 13/837,739, Response filed Dec. 16, 2014 to Non Final Office Action mailed Jul. 17, 2014", 8 pgs.

* cited by examiner

MONITORING INMATE MOVEMENT WITH RFID

RELATED APPLICATION

This application is a continuation of application Ser. No. 13/837,739, filed Mar. 15, 2013, entitled "Monitoring Inmate Movement With RFID", and issued as U.S. Pat. No. 9,024,754 on May 5, 2015, priority to which is claimed and the entirety of which is incorporated herein by reference.

BACKGROUND INFORMATION

Officers at secure facilities can face many challenges in monitoring the whereabouts of inmates. Such monitoring can include visual inspection and verification on a strict schedule. Such monitoring can require the Officers to have a detailed knowledge of which inmates can associate with each other, and which areas of a premises the individual inmates are permitted to occupy.

DETAILED DESCRIPTION

Various embodiments illustrated and described herein provide solutions to efficiently and accurately monitor or document the movement of offenders (e.g., inmates). These and other embodiments are described, with reference to the figures, herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter.

Such embodiments of the inventive subject matter may be referred to, individually and/or collectively, herein by the term "invention" merely for convenience and without intending to limit the scope of this application to any single invention or inventive concept if more than one is in fact disclosed. The following description is, therefore, not to be taken in a limited sense, and the scope of the inventive subject matter is defined by the appended claims.

The disclosure presents methods and apparatuses for monitoring offender movements using one or more Radio-Frequency Identification (RFID) readers. The RFID reader can scan for a transponder associated either directly or indirectly with an offender (e.g., inmate). The scanning can cause information associated with the offender associated with the transponder to appear on a display coupled to the RFID reader. When an authorized user scans the transponder the user can view, add, or alter the information that is displayed when the transponder is scanned. The RFID reader can send data collected from the scan to a web service or middleware for analysis. Alternatively, the RFID reader can do at least a portion of the analysis itself, such as in embodiments where the RFID reader includes an operating system and an application stored thereon. The information that is entered can be saved to remote or local databases. In this way, managing information about an offender or an item associated with the offender can be automatically maintained and updated. Such a system can be advantageous when implemented in a detention center, incarceration facility, mental health facility, or any other place where information about people can be tracked or managed.

Secure facility agencies can face logistical, communication, and records management challenges when managing offenders (e.g., incarcerated persons). This includes processing, providing care, and collecting a wide range of information about each of the offenders including a direction the offender is moving. Various embodiments illustrated and described herein include systems, methods, and software to assist in such situations. For example, typical embodiments assist in rapid recording and monitoring a wide range of data about offenders including position of the offender at a given scan time and direction the offender was traveling at a given scan time. One or more embodiments may do so in a user-friendly and efficient manner through a networked computing environment.

Custodians of persons in a facility manage many responsibilities including a significant amount of documentation in order to capture data pertinent to each person they are responsible for. Custodians (e.g., secure facility officers) may face challenges in managing persons in their facilities, such as tracking their location. To help mitigate such risks, some embodiments herein include systems, methods, and software that provide automated data documentation indicating a direction an offender is moving or using progressive scanning (discussed in more detail herein).

These and other advantages can be realized using one or more embodiments disclosed herein. The systems, methods, and software are now described in more detail with reference to the drawings.

Figure 1:
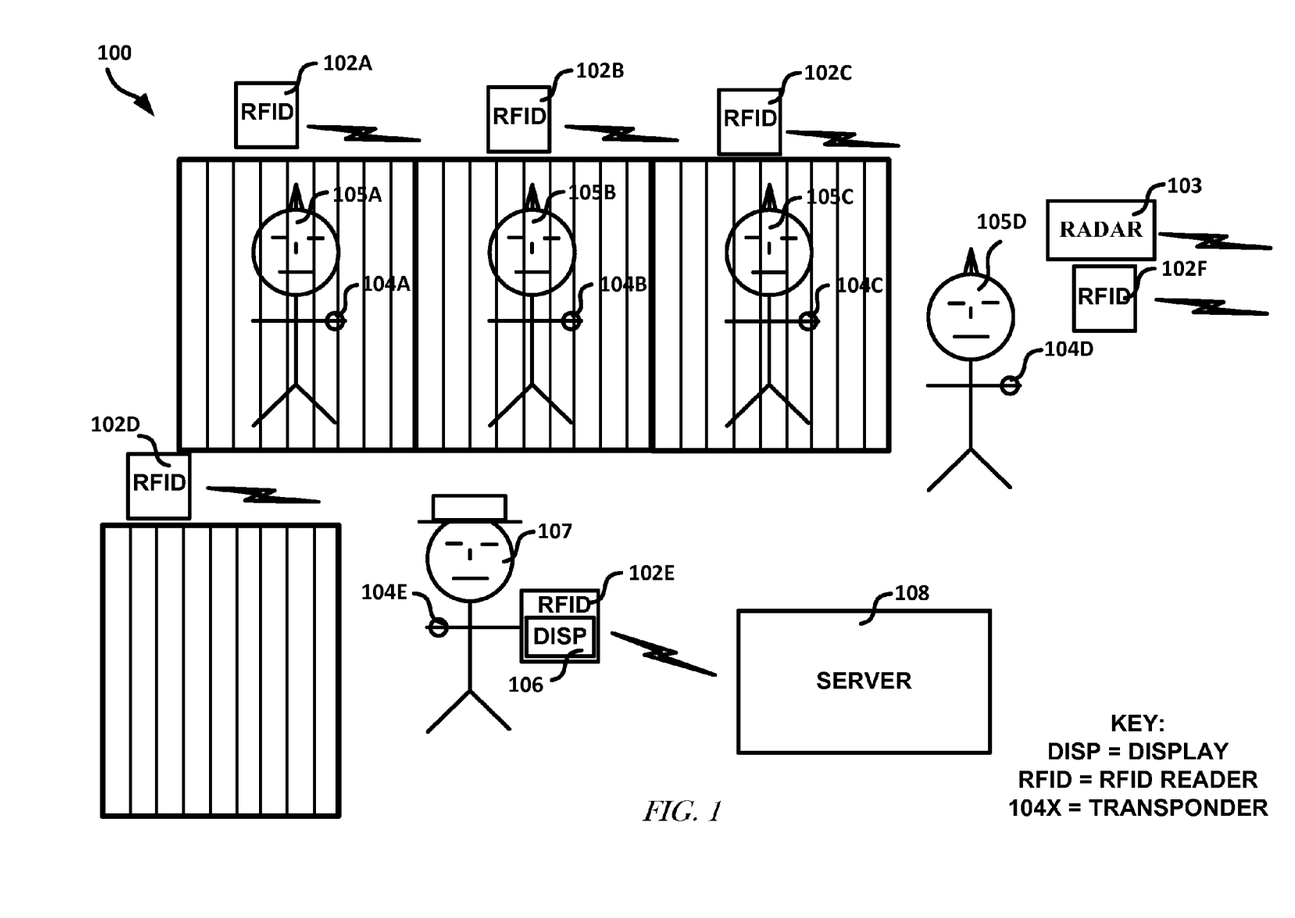
FIG. 1 illustrates a diagram of an example of a secure facility, according to an example embodiment.

FIG. 1 illustrates a networked system 100 configured for automated offender documentation, according to an example embodiment. The system 100 can include one or more RFID readers 102A-102F, one or more transponders 104A-104E, or a server 108.

The RFID readers 102A-102F can be mobile (e.g., handheld) or fixed in the area in which they are deployed. An example of a fixed RFID reader 102 includes a portal-based RFID reader 102 that forces an offender 105 to walk through a portal within range of the RIFD reader 102. In the example shown in FIG. 1, RFID readers 102A-102D and 102F are fixed, while RFID reader 102E is mobile. The RFID readers 102A-102F can be assigned a name (e.g., a collection of characters, letters, numbers, or other symbols) to uniquely identify the RFID reader 102. The RFID readers 102A-102F can each be assigned to a specific location. The RFID reader's location can be configured such that the RFID readers 102A-102F, in aggregate, can monitor a substantial portion of the premises in which they are deployed for the presence of a transponder 104A-104D. The location of an RFID reader 102 can be determined through global positioning systems (GPS) software on the RFID reader 102, a location code stored in a database (e.g., database 222 of FIG. 2 or other computer memory), or other location to allow software services to verify the location of the RFID reader 102. In one or more embodiments, the RFID readers 102A-F can be configured to detect a transponder 104 located within a specific range of the RFID reader 102A-102F. In such embodiments, the RFID reader 102 can send an interrogating signal to a transponder 104 and receive an identifying signal in response to the transponder 104 receiving the interrogating signal. The identifying signal can include a unique identifier (e.g., a specific frequency, signal shape, or other unique identifier) corresponding to that transponder 104. The RFID reader 102 can be internal or external to a building on the premises in which the system 100 is deployed. For example, RFID readers 102A-D can be internal to a detention center building, RFID reader 102E can be either internal or external to the detention center building, and RFID reader 102F can be external to the detention center building, such as in a courtyard or a recreation area.

The RFID readers 102A-102F can each be assigned to a specific customer (e.g., an entity interested in using a movement or monitoring system). Such an assignment can help a data center manage information received from the RFID readers 102 (note: "102" is used to refer to RFID readers in general). The RFID readers 102A-F can be connected to a server 108 or a network 213 (see FIG. 2) through a wired or wireless connection (indicated by a lightning bolt in FIG. 1). A wired connection can include an Ethernet connection or other protocol operable to connect the RFID readers 102A-102F to the server or network. A wireless connection can include Wi-Fi, Bluetooth, Zigbee, or other protocol operable to wirelessly connect the RFID readers 102A-102F to the server 108 or network 213.

An RFID reader 102A-102F can be associated with one or more programmable events 220. A programmable event 220 can include an offender head count, location verification, or other event. For example, the RFID readers 102A-102F can be programmed to perform a scan at a particular time. The results of the scan can be sent to the server 108. The results retrieved can be compared to a list of expected results. If the comparison shows an irregularity or a deviation from what is expected, a warning or alert can be sent to the proper personnel (e.g., one or more custodians responsible for managing the person associated with deviation). The proper personnel can then respond to the situation. In the case of a detention center, a warning can be sent to a detention facility officer 107 in charge of the offender 105 corresponding to the deviation. The system can enable one or more RFID readers 102 to perform one or more pre-programmed programmable events 220 (see FIG. 2), such as simultaneously or on a scheduled or non-scheduled basis. The programmable events 220 can enable the RFID readers 102 and the system to be flexible in implementing or at least partially automating a wide range of offender monitoring services, such as monitoring the movement of offenders 105 (note that "105" is used to refer to offenders generally). The programmable events can allow an RFID reader 102 to help perform multiple tasks simultaneously.

One or more user defined monitoring rules 222 (see FIG. 2) can be assigned to a programmable event 220. User defined monitoring rules 222 can include offender 105 movement restrictions (e.g., offender 105A is not to be outside his cell at a certain time) or offender relation restrictions (e.g., offenders 105A and 105B are not to be within a certain distance of each other). The monitoring rules 222 can include an offender's housing assignment or times that an offender is to be in there cell. Other user defined monitoring rules can include ensuring one or more inmates arrive to a pre-defined destination within a pre-defined amount of time, validating that inmates assigned to a housing unit are present (e.g., conducting a head count), or notifying system users that an RFID reader 102 detected a transponder 104 when no transponder 104 (note that "104" is used to refer to transponders generally) detection was expected or allowed.

The monitoring rules 222 can include rules defining an amount of time allowed for travel from a point of origin to a destination or requiring one or more RFID readers 102 to read the transponder 104 of an offender while the offender is en route to the destination. The RFID reader 102 can be caused to scan for the transponder 104 within a window of time after the offender has left the point of origin. For example, the RFID reader 102 can be caused to scan for the transponder 104 associated with the traveling offender 105 for five minutes after the offender 105 has left the point of origin. In another example the RFID reader 102 can be caused to scan for the transponder 104 from between one minute after the offender has left the point of origin to eleven minutes after the offender 105 has left the point of origin.

The monitoring rules 222 can include a capacity limitation that defines a maximum number of offenders 105 that can be within a certain room or area at a given time. If the capacity limitation is exceeded, an alert can be communicated to appropriate personnel. The monitoring rules can include ensuring that offenders 105 en route to a common destination do not have a keep separate restriction.

User defined processes can be assigned to a programmable event 220. User defined processes can include, for example, that a web service can search for predefined restrictions that might preclude an inmate from being able to enter a certain room or area or that two or more inmates are not allowed to associate with each other (e.g., be within the same room or area of the facility). The user-defined processes can validate that a direction an inmate was detected walking is acceptable. This can be accomplished using a radar module 103. The user-defined processes can include a user causing an RFID reader 102 to scan for a transponder 104 in a specific location (e.g., a multi-purpose room, such as a rec room).

The user-defined processes can include a scheduled or non-scheduled offender 105 movement to a destination. For example, a user can define that an offender is to get medical attention and that the offender is to travel to the health care facility. The user-defined processes can be created using a scheduling module 211 that can be a part of the web application 210 or a mobile application. The ability for a user to schedule offender movement can be integrated with an existing scheduling solution.

The user can initiate an offender 105 movement using the web application 210 or a mobile application, such as by using the scheduling module 211. The user can have an RFID reader 102 (e.g., a fixed RFID reader) scan the transponder 104 associated with the offender 105. The user can specify the destination of the offender 105 before or after the transponder 104 was scanned. The system can then monitor the offender's progress to the destination (e.g., "progressive validation"), such as by verifying the transponder 104 associated with the offender 105 passes within range of one or more specific RFID readers 102. An RFID reader 102 at or near the destination can help verify the presence of the offender 105 by scanning for the associated transponder 104.

A monitoring rule can be defined that requires the transponder 104 of a moving offender 105 to be scanned by an RFID reader 102 within a specified period of time. An alert can be created if the RFID reader 102 does not detect the transponder 104 within the specified period of time. Progressive validation can include scanning for a transponder 104 that is off the specified path. An alert can be created if the transponder 104 is detected off the path. Progressive validation can also include directional detection and one or more monitoring rules regarding the allowed direction of the offender 105 through an RFID reader 102. An alert can be created if the direction of the offender 105 is not allowed by the monitoring rules 222.

Progressive validation can include validating that an offender 105 is traveling along a pre-defined path by detecting the transponder 104 corresponding to the offender 105 at an RFID reader 102 at an intermediate location between the origin and the destination of the offender. Progressive validation can be used in only selected movements of offenders 105, such as movements to specified destinations or within a specific period of time, all offender 105 movements, all or specified movements of a specific offender 105, a combination thereof, or other movements. For example, progressive validation can be used for an offender 105 with pre-defined security restrictions or related alerts, or an association with a specific monitoring rule or alert that was created. Progressive validation can include verifying that one or more staff of the facility (e.g., a detention center officer 107) is near an offender 105 before the offender 105 is permitted to begin the movement. Progressive validation can include verifying, such as by personnel responsible for monitoring movement of the offender 105, that the offender 105 is in transit or that the offender 105 is at the destination of the movement.

Progressive validation can be performed by a user (e.g., a detention center officer). Such validation can occur through a user verifying, such as by manually entering into the system, that the offender movement occurred. Such manual validation can include entering a unique ID of the offender 105 or transponder 104 associated with the offender 105. The web application can record data pertinent to location (e.g., a preprogrammed database code, a computer name through which data was entered, an Internet Protocol (IP) address associated with the computer, or the like) with a progressive validation performed by a user.

Non-scheduled movement can include one or more offenders 105 that can have the same or different destinations. An offender's destination may not always be specified by a user before offender 105 movement has begun. For example, when it is discovered that two offenders 105A-105B who are not supposed to be associating with each other are in the same area, the system can send an alert to move the offender 105 before the destination of the offender is known. One or more specified RFID readers 102 can be forced to scan for the transponder 104 of the offender 105 and whichever RFID reader 102 detects the transponder 104 can date or time stamp the read event and confirm the offender's presence at the location of the RFID reader 102.

A user can define an arrival time or a return time for scheduled or non-scheduled movements. An arrival time can define a specified period of time in which an offender 105 should authenticate their arrival by having a transponder 104 scanned by an RFID reader 102 at or near their destination, such as to not trigger an alert. A return time can define a specified period of time within which an offender 105 should authenticate their return to the point of origin by having a transponder 104 scanned by an RFID reader 102 at or near their point of origin, such as to not trigger an alert.

A user (e.g., a system administrator) can define or allow scheduled or non-scheduled offender movement to not trigger an alert. This allowance can be granted on a per movement, per offender 105, or per group of offenders basis. In such a configuration an offender 105 can be allowed to authenticate their arrival time or return time late without triggering an alert. In one or more embodiments, the allowance can be granted to an offender 105 that has few, no, or only certain restrictions (e.g., monitoring rules associated with the offender 105) or offenders in good standing. A record of the late authentication can be recorded even if no alert is created. The record can include the time the offender 105 authenticated their arrival, or the time the offender 105 was detected at the destination or point of origin. The record can include an indication of how late the offender was in authenticating their arrival or return. The system can notify one or more specified users in response to an offender 105 arriving at a destination. The notification (e.g., message) can include the date or time of arrival, a unique ID associated with the offender 105 or transponder 104, or other information pertinent to the arrival of the offender 105.

If a transponder 104 becomes inoperable (e.g., because the transponder 104 failed or the offender damaged it either intentionally or unintentionally or lost it) the arrival time or return time can be manually entered into the system, such as through server 108. The record associated with such an authentication can include an indication that the authentication was done manually or the reason the authentication was done manually.

A user can predefine acceptable paths from a point of origin to a destination or for the return trip to the origin from the destination. The user can define that the transponder 104 associated with a moving offender 105 be scanned by one or more RFID readers 102 while en route. The predefined paths and RFID readers 102 to scan the transponder 104 on the path can be stored in the database 214. The acceptable travel paths can be created at run-time, such as by using the web application 210. The paths can be saved into a library of predefined paths. The paths can be accessed by users with sufficient privileges to allow them to create new paths or modify existing paths. The disclosure regarding FIG. 3 describes predefined acceptable paths.

Figure 2:
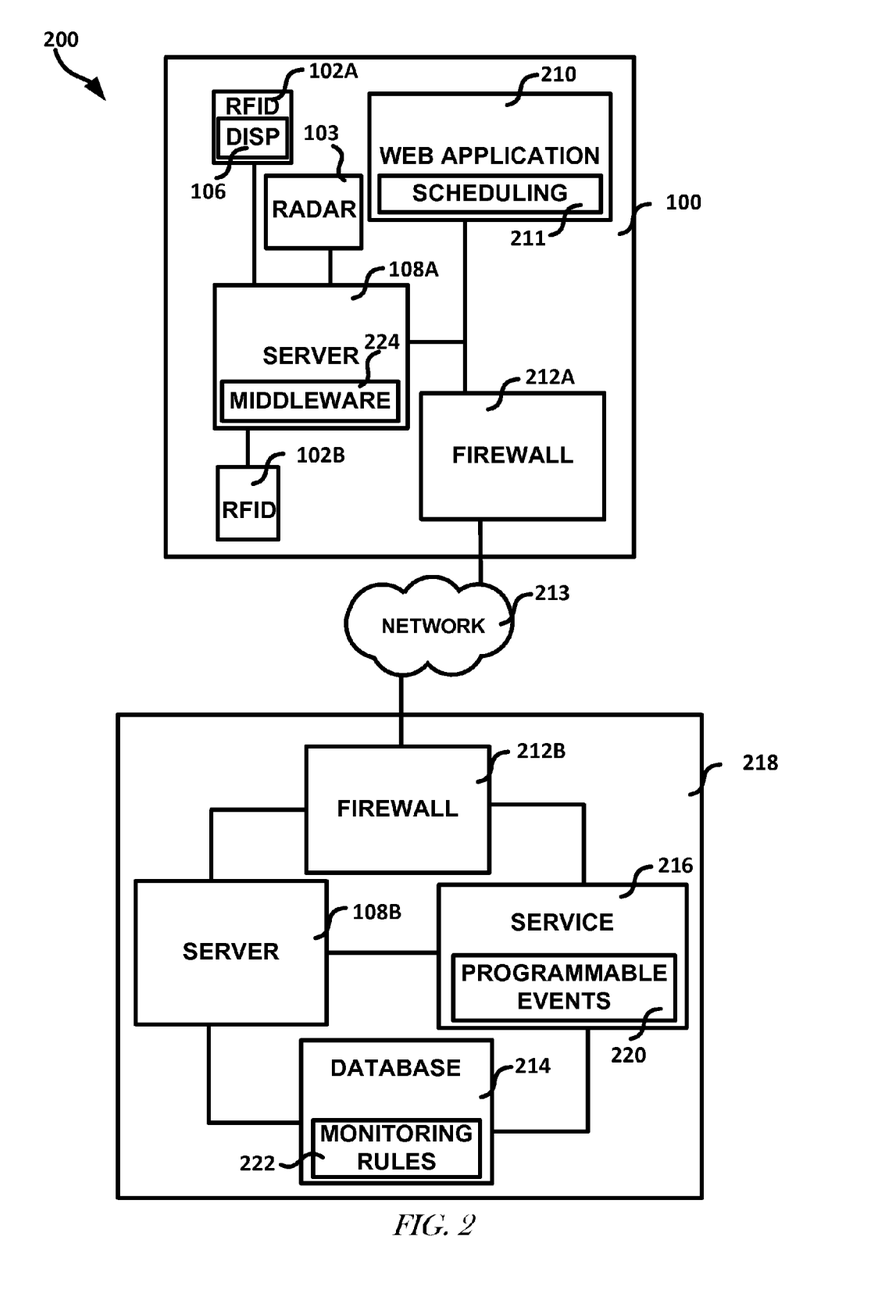
FIG. 2 illustrates a logical block diagram of an example of a networked system for automated offender movement detection, according to an example embodiment.

A programmable event 220 can be associated with more than one RFID reader 102. For example, in the example of doing a head count in a secure facility a programmable event 220 can trigger RFID readers 102A-120D to determine the number of offenders in their cell, housing unit, or some other location, such as an infirmary or recreation yard. Associating a programmable event 220 with an RFID reader 102 can be done automatically, such as by a computer processor, or can be done manually by a user through an application configured to manage the configuration and implementation of an offender documentation system. The server 108A or 108B can instruct or poll the RFID readers 102A-102F for collected data or the RFID readers 102A-F can be programmed to send the collected data to the server 108A-108B or the service 216. The data can be sent as soon as the data is collected, on a pre-determined schedule, or a combination thereof.

One or more of the RFID readers 102A-102F can be configured to constantly or intermittently monitor for a nearby transponder 104 (e.g., a passing transponder 104 or a transponder 104 that has moved within range of the RFID reader 104). Such RFID readers 102 can be helpful in monitoring areas where transponders 104 are not expected to be or in monitoring transit points to monitor the progress of offenders 105 in transit. When one of these RFID readers 102 detects the presence of a transponder 104, an alarm or message can be sent to the proper personnel, such as through the server 108 or the network 213. The message or alert can be a text, or other content, message to a mobile device, an email (e.g., including an attachment), or other notification.

The data sent from the RFID readers 102A-102F to the server 108 can be encrypted. The data from the RFID reader 102 can be sent to a server 108 that is running middleware 224 (e.g., software that provides services to a software application beyond those available from an operating system or an application that logically and physically runs between a sender and a receiver).

In one or more embodiments, rather than using middleware 224 or calling one or more services 216 (e.g., services provided over the internet or through the network 213 with or without the internet), the RFID reader 102 can include one or more services, which may be in the form of an application programming interface (API), database connectivity client, or other logical element to perform the functions of the middleware 224 or the service 216. An example of an RFID reader 102 that can be used to perform the functions of the middleware or the service 216 is the FX7400 RFID reader from Motorola, Inc. of Schaumburg, Ill.

The RFID reader 102E can include a screen configured to display information related to scanning a transponder 104. The RFID reader 102E can be configured to display, such as on display 106 a schedule to a user indicating when or where RFID reader 102E scans are to occur. The schedule can be retrieved from the database 214 or the scheduling module 211.

The radar module 103 can be situated near an RFID reader 102F so as to detect a number of offenders 105 passing thereby or to detect a direction an offender 105 is traveling. The radar module 103 can be incorporated into an RFID reader 102. Including the radar module 103 in the system can help a system determine the number of offenders 105, the direction each offender 105 is traveling, or the like of a transponder 104 within range of the radar module 103. Such information can be relayed to the server 108. The information sent to the server 108 can be accompanied by an identification of the transponder 104 and a nearby RFID reader 102.

The RFID reader 102 can include one or more radar modules 103 electrically or mechanically coupled thereto. An example of such a radar detector or people counter is the OBID® i-scan® from Feig Electronic of Germany. Such radar detectors are operable to detect persons moving towards and going away from the radar or the associated RFID reader 102. The direction can be determined by transmitting a signal, monitoring for signal reflections, and detecting how much time it takes for the reflection to be detected by the radar detector.

A monitoring rule 222 can include that the service 216 is to validate the direction the offender 105 was detected moving. When the service 216 determines that the offender 105 was moving in an unacceptable direction, a system alert can be triggered and the system can make a record of the violation.

The transponder 104 can transmit a unique identifying signal that is recognizable by an RFID reader 102. In one or more embodiments, the transponder 104 can emit the identifying signal in response to a signal sent from the RFID reader 102. The transponder 104 can be incorporated into a bracelet, a chip configured to be embedded in clothing, an implantable device, an identification card, or may take some other form that allows the transponder 104 to travel with an offender 105 (e.g., inmate) or an item of interest. The transponder 104 can be assigned to an individual offender 105 or an entity at the secure facility other than an offender 105, such as a detention center officer 107. In a system that includes a transponder 104 associated with an entity at the secure facility, the system can detect when the entity (e.g., a detention center officer 107), is near an offender 105.

The server 108 can be configured to run a web application 210 or middleware 224 configured to implement or manage automatic offender documentation. The server 108 can receive data from the RFID readers 102A-102F. The data received can include a unique identification (ID) key that identifies the RFID reader 102A-102F that sent the data. The server 108 can look up the RFID reader ID and correlate a specific time or location with the RFID reader 102A-102F. The server 108 can send the time, location, and RFID ID data to another server 108B, such as at a data center 218.

The server 108 can be part of a Local Area Network (LAN), or it can be hosted remotely. The middleware 224 that can be accessible through the server 108 can either be hosted locally (e.g., through a LAN) or remotely. The middleware 224 can send data received or modified by the server 108 or middleware 224 to a service 216.

FIG. 2 illustrates an example of a networked system 200 for automated offender documentation. The networked system can include the RFID readers 102A-102B the server 108A, a web application 210, or a firewall 212A. The RFID readers can be coupled to the server 108A such that data can be sent to the server 108A from the RFID reader 102A-102B and data can be sent to the RFID reader 102A-102B from the server 108A. The server 108A can be coupled to the web application 210, such as to host the web application 210. The server 108A can be coupled to the firewall 212A so data sent from and received at the system 100 can be protection scanned, encrypted, or decrypted.

While the server 108B, service 216, and the database 214 are depicted as individual units, they may be implemented on one or more servers. For example, the server 108B, service 216, and database may all be implemented on the same server, or each may be implemented on its own server.

The web application 210 can render web pages that can provide the functionality of the service 216 to a user. The web application can be hosted locally, such as on server 108A, or remotely, such as on server 108B.

The networked system can include the system 100 coupled to the data center 218, such as through a network 213 (e.g., the internet). Such a configuration can allow the data storage for and analysis of monitoring RFID reader 102 and transponder 104 interactions to be off site. The data center 218 can include a firewall 212B coupled to a server 108B and a service 216, such that the firewall 212B can help to ensure that the data sent to the server 108B and the service 216 will not harm the server 108B or service 216. The server 108B can be coupled to a database 214, such that the database 214 can provide data to the server and receive data from the server 108B. The server 108B can be coupled to the service 216, such that the service 216 can provide functionality related to automated offender documentation to the server 108B. The data received at the server 108B can be used in rendering web pages to users. The database 214 can be coupled to the service 216 to provide data to the service 216 and to receive and store the results of operations performed by the service 216.

The firewalls 212A-212B can scan incoming and outgoing data for malware to help reduce the chances of a malicious attack on the system 200. The firewall 212A can encrypt data that is outgoing or decrypt data that is incoming. The encryption or decryption can be accomplished using a separate encryption or decryption module and can be incorporated at different places in the system such as on an RFID reader 102, so as to allow encrypted data sent to be sent to the server 108B.

The service 216 can be deployed locally on the server 108B or hosted remotely. The service 216 can retrieve programmable events 220 currently assigned to an RFID reader 102. The programmable events 220 can be stored in the database 214, on the server 108A-108B, or on the service 216. The service 216 can run processes associated with a programmable event 220. For example, the service 216 can analyze, organize, or format collected data. The analyzed, organized, or collected data can be sent to the database 214 for retention. The analysis can include comparing the data to monitoring rules 222 associated with a programmable event 220. Such comparisons can monitor compliance and detect violations of the monitoring rules 222 and an alarm, alert, or message can be sent to the proper personnel when a monitoring rule 222 has been violated.

The service 216 can correlate collected data. A correlation of data can help the service 216 detect a violation of a monitoring rule 222. A correlation can be performed at an individual offender level, a block level, an entire building (e.g., secure facility, such as a detention center, mental health facility, or the like) level, or other level. For example, the service 216 can correlate all data associated with the same offender or a cellblock and compare that data to the monitoring rules 222 relating to the offender or the cellblock to determine if the offenders 105 comply with the monitoring rule or a violation has occurred. The service 216 can compare one offender's data to another offender's data to determine if a monitoring rule 222 violation has occurred. Such comparisons can be useful when a monitoring rule 222 states that two or more offenders are to be kept separately, not contact each other, or otherwise not associate with each other. The service 2126 can be hosted locally (as shown) or can be hosted on the network 213 (e.g., cloud).

The service 216 can receive and process data from the middleware 224. The processing can include authenticating a customer name. Authenticating a customer name can be done by verifying a customer's port number in examples where a customer has been assigned a unique port number. Authenticating can also include verifying RFID reader 102A-102F ID information and transponder 104A-D ID information received is consistent and assigned to that customer. A user (e.g., an end user) can automate the running of programmable events 220 through scheduling them through the service 216. A user can manually trigger a programmable event 220 to for the service 216 to execute. The user can customize the operations performed by the service 216 in running a programmable event 220, such as through the server 108A-108B or web application. The service 216 can compare data received to monitoring rules 222 and determine if a monitoring has been violated. The service can initiate an alert process in response to determining that a rule has been violated.

The database 214 can store monitoring rules 222 therein. The monitoring rules 222 can define the relationship between or validate the performance expectations between a programmable event 220 and a transponder 104. This can include cross-referencing other monitoring rules 222 (e.g., restrictions or requirements) associated with a given transponder 104. For example, an offender 105 could be restricted from moving or from entering a specific room or area of a building. The rule or restriction could be for punitive reasons, health concerns, safety concerns, or the like. For example, a monitoring rule 222 can indicate that one or more inmates are to be kept separate at all times. The monitoring rule 222 can have an associated duration in which the monitoring is valid and is to be referenced by the service 216. One or more monitoring rules 222 can be associated with a specific offender such that when the offender is no longer in the building, the monitoring rule 222 is no longer referenced by the service 216.

The service 216 can analyze the data received from the RFID readers 102A-102F and compare the received data to relevant monitoring rules 222 to determine if an alert or message should be sent to the relevant personnel. If no violation is detected the service 216 can initiate a sequence of operations (e.g., a pre-programmed sequence of operations, processes, or events) to complete. For example, the service 216 can look for a violation of a user defined process rule (e.g., an inmate is traveling the wrong direction or there are too many inmates in a specific area). The service 216 can then search for violations of monitoring rules (e.g., a first inmate cannot be in a specific area because a second inmate is already present in the area, an inmate is not allowed to be in the rec area, or other monitoring rule violation). The service 216 can then continue to perform another process (e.g., a user defined process), such as documenting the locations of inmates that are within the range of an RFID reader 102. Future data received can be analyzed (e.g., compared to monitoring rules 222) in real-time to determine if an alert or message is to be sent. When the analysis is complete, the service 216 can record that the analysis was completed in the database 214.

In the case of an Internet failure (e.g., the Internet is temporarily unavailable) the middleware 224 can be configured to store received data in a local memory. When Internet connectivity is restored, the received data can be sent to the service 216. Such a configuration can be helpful in embodiments that include Software as a Service (SaaS) or a remotely hosted server. The middleware 224 can be configured to determine if a monitoring rule 222 has been violated, such as when the Internet connection to the service has failed. In one or more embodiments, the middleware 224 includes a subset of all the monitoring rules 222 for a specific system. These monitoring rules 222 can be the most important rules (e.g., the rules that the user does not want violated). In one or more embodiments, the service 216 can determine if a monitoring rule 222 has been violated after it has received the relevant data.

The middleware 224 can reside on the server 108A or 108B, locally or remotely, respectively. In one or more embodiments, the middleware 224 can be hosted in a network 213 (e.g., cloud) server. Such an implementation can provide automated offender documentation to a user through a Software as a Service (SaaS) configuration. The middleware 224 can provide communication between the RFID readers 102A-102F and the data center 218. The middleware 224 can be configured to encrypt data it receives from the RFID readers 102A-F and send the encrypted data to the service 216, server 108B, or the database 214.

The database 214 can store data from the RFID readers 102A-102B, the service 216, the web application 210, or the server 108A-B.

Figure 3:
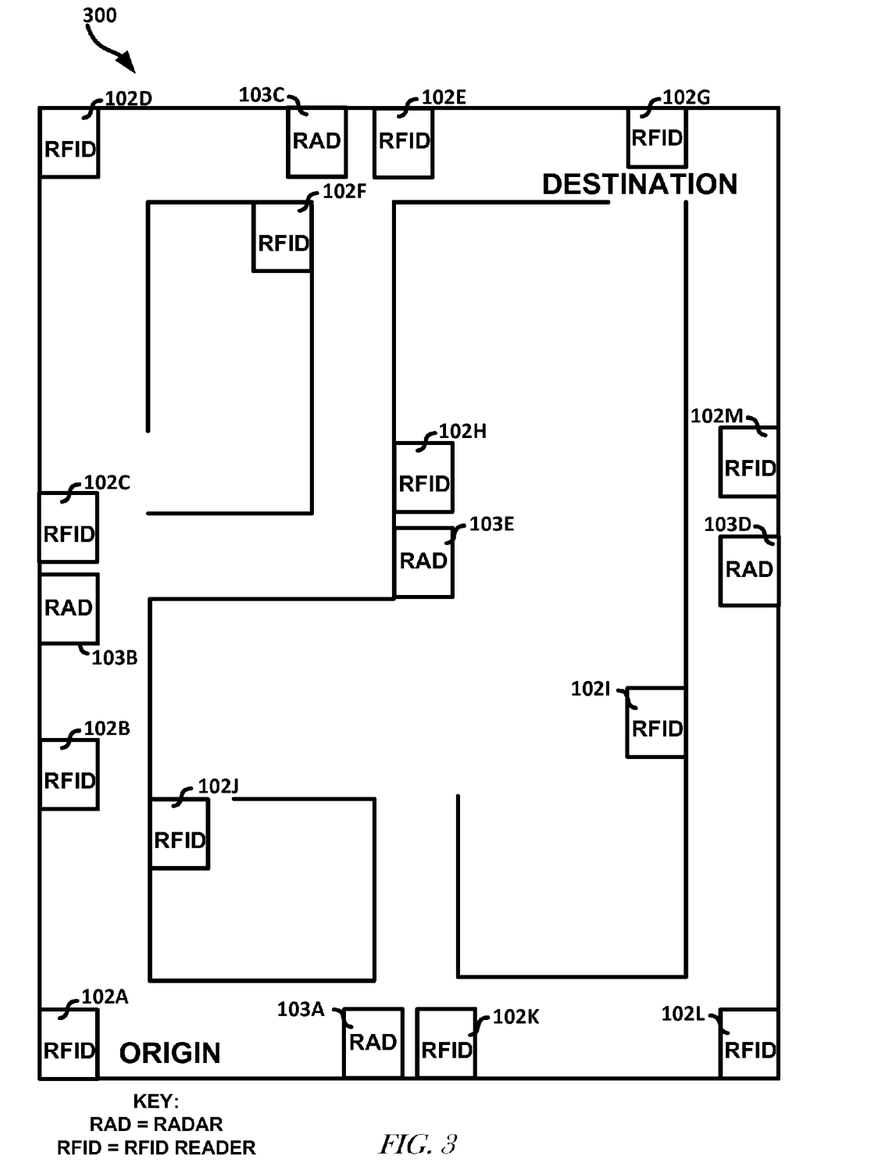
FIG. 3 illustrates an example of an area outfitted for automated offender movement detection.

FIG. 3 illustrates a building 300 configured to monitor the movement of offenders 105 therein. The building can include a plurality of RFID readers 102A-102M or a plurality of radar modules 103A-103E. A user-defined process can indicate that an offender 105 is to travel a path from the "origin" to the "destination". One or more monitoring rules 222 associated with the user-defined process can define a path that the offender must travel to get to the destination. In this example the path is from the "origin" go past RFID reader 102K, turn left at RFID reader 102L, go past RFID reader 102M, and proceed to the destination.

In this example if any of RFID readers 102B-102F or 102H-102J detects a transponder 104 associated with the offender 105 during the time of the travel, and then an alert can be sent to the appropriate personnel. Similarly if radar modules 103A or 103D detect the transponder 104 associated with the offender 105 traveling in a direction inconsistent with the pre-defined path, an alert can be sent to the appropriate personnel.

One or more monitoring rules associated with the user-defined process can stipulate that the RFID readers 102K, 102M, and 102G are to detect the transponder 104 associated with the offender 105 within a specified period of time. If any one of the RFID readers 102K, 102M, and 102G does not detect transponder 104 within the specified period of time, then an alert can be sent to the appropriate personnel. The radar module 103A and the RFID reader 102K can, in combination, determine the number of transponders passing by and the IDs of the transponders. This data can be used to determine if personnel (e.g., personnel defined by the user-defined process required to accompany the offender(s) in transit) are accompanying the offender(s) to the destination. This data can also be used to determine if the correct number of offenders 105 is in transit. If not, then an alert can be sent to the proper personnel.

Figure 4:
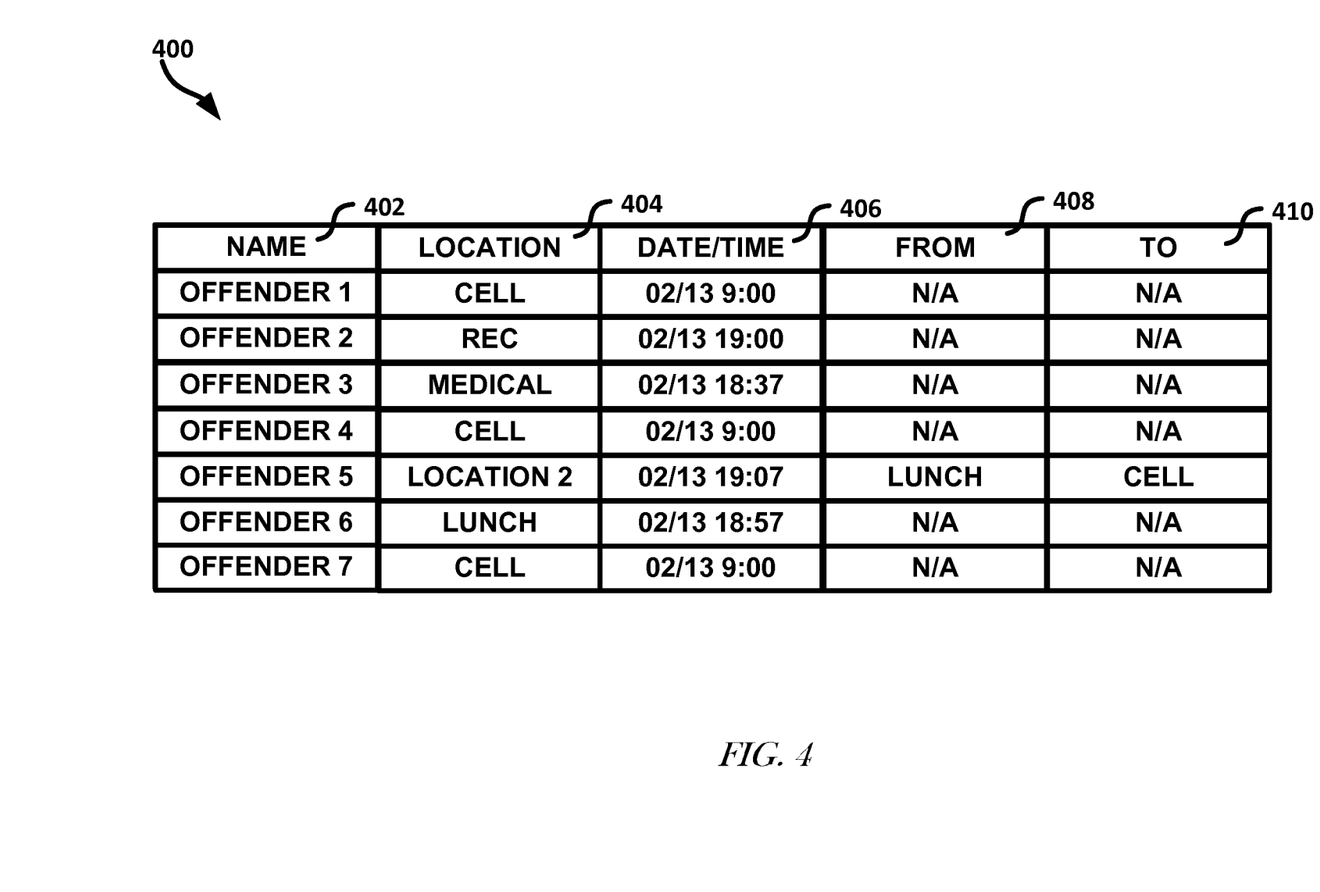
FIG. 4 illustrates an example of a user interface, according to an example embodiment.

FIG. 4 illustrates a user interface 400, according to an example embodiment. User interface 106 can be substantially similar to user interface 400. The user interface 400 can include information such as the names 402 or unique IDs of offender 105 in a secure facility. The user interface 400 can show a location 404 that a transponder 104 associated with an offender 105 was last detected and the date/time 406 of the last detection. The user interface 400 can show whether an offender is in transit, such as by showing where the offender 105 is traveling from 408 and where the offender 105 is scheduled to travel to 410. Other information pertinent to the monitoring of offender movement can be displayed on the user interface 400.

Current or historical movement data can be graphically represented on an electronic map of the facility, such as the map of the facility shown in FIG. 3. Information pertinent to a movement can be overlaid at positions corresponding to where the information was collected.

Figure 5:
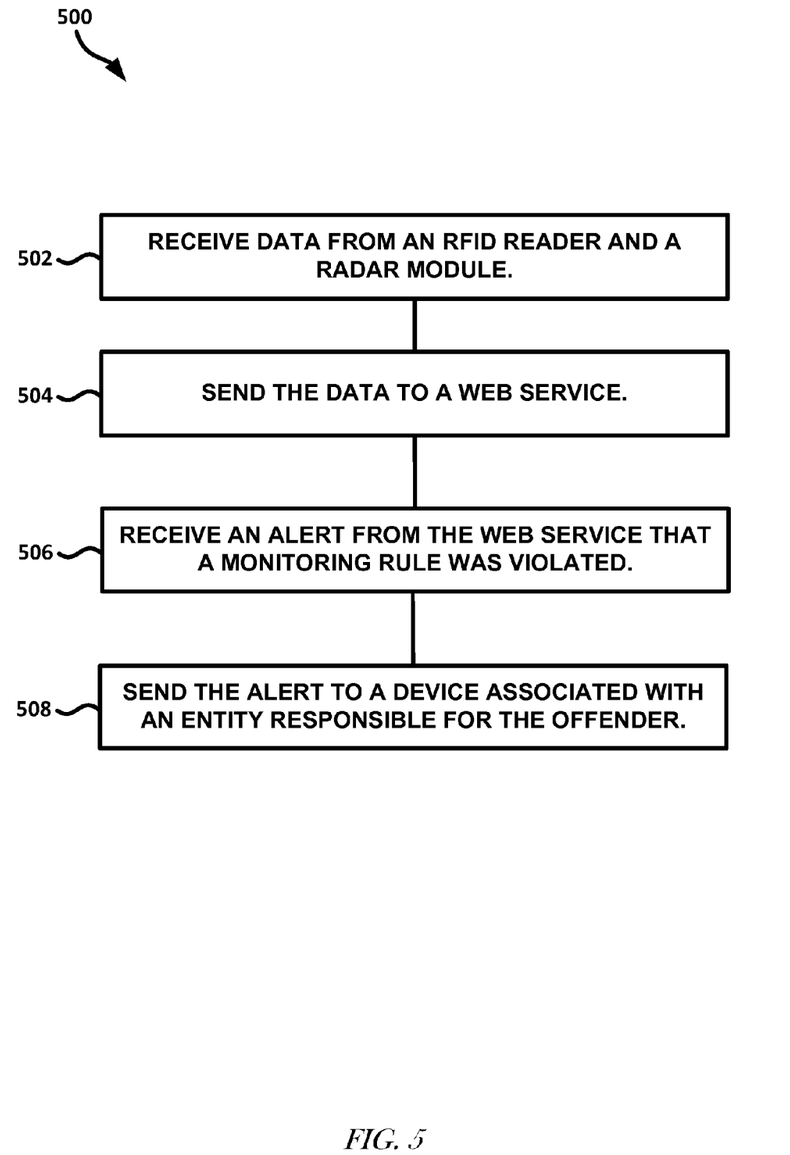
FIG. 5 illustrates another example of a technique for automated offender movement detection, according to an example embodiment.

FIG. 5 illustrates a flow diagram of a technique 500 for monitoring offender movement, according to an example embodiment. At 502, data can be received from one or more RFID readers 102 and one or more radar modules 103. The data received can indicate a time an RFID reader 102 detected a transponder 104 associated with an offender 105, a unique identifier associated with the transponder 104, a unique identifier associated with the RFID reader 102, or an indication of a direction the offender was traveling.

At 504, the data can be sent to a web service 216. At 506, an alert that a monitoring rule 222 was violated can be received from the web service 216. The monitoring rule 222 can relate to the offender 105. At 508, the alert can be sent to a device (e.g., a mobile device) associated with an entity responsible for the offender 105.

Figure 6:
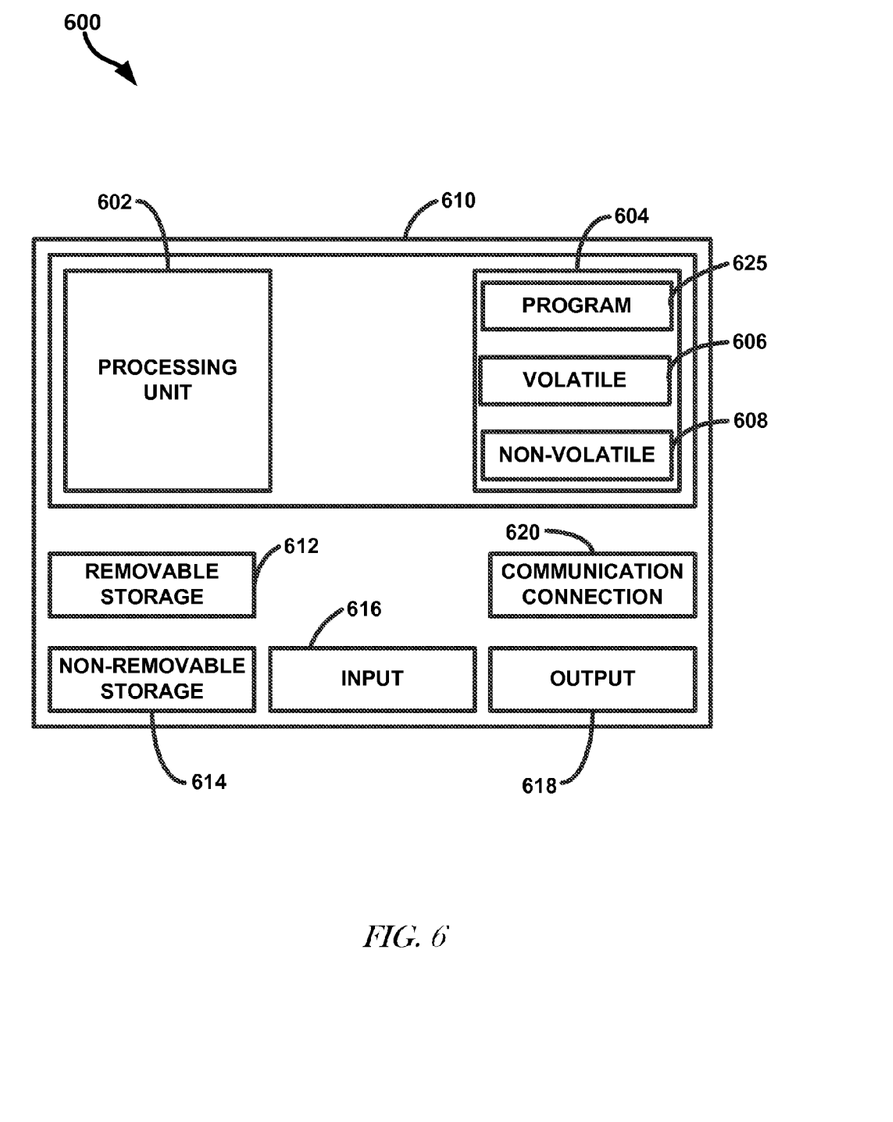
FIG. 6 illustrates an example of a computer system, according to an example embodiment.

FIG. 6 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. An example of a computing device in the form of a computer 610 may include a processing unit 602, memory 604, removable storage 612, and non-removable storage 614. Memory 604 may include volatile memory 606 and non-volatile memory 608. Computer 610 may include—or have access to a computing environment that includes—a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 610. A hard drive, CD-ROM, and RAM are some examples of articles including a non-transitory computer-readable medium. For example, a computer program 625 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 610 to provide generic access controls in a COM based computer network system having multiple users and servers.

The functions or algorithms described herein are implemented in hardware, software, or a combination of software and hardware in some embodiments. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely embodiments. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flows are applicable to software, firmware, and hardware implementations.

Systems and methods of the present disclosure may be implemented on a mobile device as a mobile application, web-based application, on a desktop computer as a computer application, or a combination thereof. A mobile application may operate on a Smartphone, tablet computer, portable digital assistant (PDA), ruggedized mobile computer, or other mobile device. The mobile device may be connected to the Internet or network via Wi-Fi, Wide Area Network (WAN), cellular connection, WiMax, or any other type of wired or wireless method of networking connection. In some embodiments, a web-based application may be delivered as a software-as-a-service (SaaS) package (e.g. cloud-based embodiments) accessible via a device app, a web browser application, or other suitable application, depending on the particular embodiment.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system comprising:
   a transponder associated with an offender;
   a radio frequency identification reader configured to transmit an interrogating signal to the transponder and receive an identifying signal in response to the transponder receiving the interrogating signal;
   a server configured to receive data from the radio frequency identification reader through a network, transmit the received data to a web service through the network, and receive an alert from the web service that a monitoring rule of a plurality of monitoring rules associated with the offender was violated, wherein the radio frequency identification reader is a first radio frequency identification reader positioned within range of an origin of a path that the offender is to travel, wherein the plurality of monitoring rules include a first monitoring rule defining a direction that the offender is permitted to travel past the first radio frequency identification reader;
   a second radio identification reader positioned within range of a destination of the path, wherein a second monitoring rule of the plurality of monitoring rules indicates that the transponder is to be detected by the second radio frequency identification reader within a first specified period of time; and
   a third radio frequency identification reader situated within range of the path between the first radio frequency identification reader and the second radio frequency identification reader.

2. The system of claim 1, wherein a third monitoring rule of the plurality of monitoring rules indicates that the transponder is to be detected by the third radio frequency identification reader within a second specified period of time different from the first specified period of time.

3. The system of claim 2, wherein the system further comprises a fourth radio frequency identification reader situated such that when the transponder is along the path, the transponder is not within range of the fourth radio frequency identification reader.

4. The system of claim 3, wherein a fourth monitoring rule of the plurality of monitoring rules indicates that the fourth radio frequency identification reader should not detect the transponder while the offender is traveling.

5. A method comprising:
   receiving data from a radio frequency identification reader, the data indicating a time the radio frequency identification reader detected a transponder associated with an offender, the data including a first unique identifier associated with the transponder and a second unique identifier associated with the radio frequency identification reader, and the data including an indication of a direction the offender was traveling;
   sending the data to a web service and receiving, from the web service, an alert that a monitoring rule corresponding to the offender has been violated by the offender;
   sending the alert to a mobile device associated with an entity responsible for the offender; and
   wherein:
      the radio frequency identification reader is a first radio frequency identification reader situated within range of an origin of a path; and
      receiving data includes receiving data from a second radio frequency identification reader situated within range of a destination of the path;
      receiving data includes receiving data from a third radio frequency identification reader situated along the path between the first radio frequency identification reader and the second radio frequency identification reader.

6. The method of claim 5, wherein sending the alert includes sending an indication that a monitoring rule indicating that the transponder is to be scanned by the second radio frequency identification reader within a first specified period of time is violated.

7. The method of claim 5, wherein sending the alert includes sending an indication that a monitoring rule indicating that the transponder is to be scanned by the third radio frequency identification reader within a second specified period of time is violated.

8. The method of claim 5, wherein receiving data includes receiving data from a fourth radio frequency identification reader situated such that it is not within range of the path.

9. The method of claim 8, wherein sending the alert includes sending an indication that a monitoring rule indicating that the transponder is not to be scanned by the fourth radio frequency identification reader is violated.

10. A system comprising:

a transponder associated with an offender;

a first radio frequency identification reader situated within range of an origin of a predefined path an offender is to travel;

a second radio frequency identification reader situated within range of a destination of the path;

a server configured to receive data from the first and second radio frequency identification readers through a network, transmit the received data to a web service through the network, and receive, from the web service, an indication that a monitoring rule relating to the offender was violated by the second radio frequency identification reader not detecting the transponder within a first specified period of time;

a third radio frequency identification reader situated along the path between the first radio frequency identification reader and the second radio frequency identification reader; and wherein the monitoring rule indicates that the transponder is to be detected by the third radio frequency identification reader within a second specified period of time different from the first specified period of time.

11. The system of claim 10, wherein the system further comprises a fourth radio frequency identification reader situated such that when the transponder is along the path, the transponder is not within range of the fourth radio frequency identification reader.

12. The system of claim 11, wherein the monitoring rule indicates that the alert is to be transmitted in response to the fourth radio frequency identification reader detecting the transponder while the offender is traveling.

13. The system of claim 12, wherein the monitoring rule indicates that no alert is to he sent in response to detecting a violation of the monitoring rule.

\* \* \* \* \*